Jan. 24, 1967  G. DOMMANN ETAL  3,300,031
COUPLING DEVICE FOR JOINING MINING CONVEYOR TROUGH SECTIONS
Filed June 15, 1965  2 Sheets-Sheet 1

INVENTORS:
GÜNTHER DOMMANN
HELMUT TEMME
BY Burgess, Dinklage &
Sprung
ATTORNEYS

Jan. 24, 1967 G. DOMMANN ETAL 3,300,031
COUPLING DEVICE FOR JOINING MINING CONVEYOR TROUGH SECTIONS
Filed June 15, 1965 2 Sheets-Sheet 2
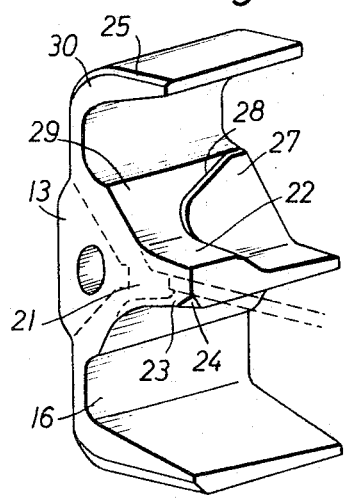
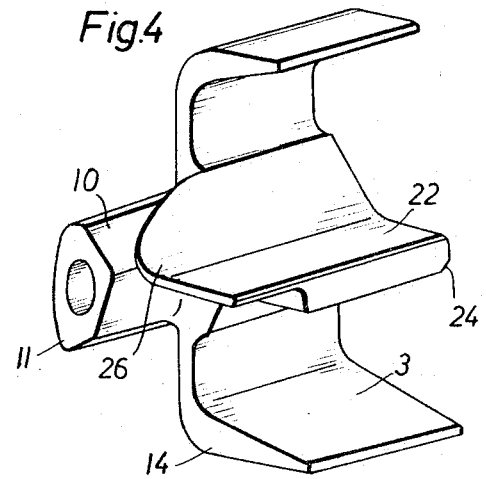
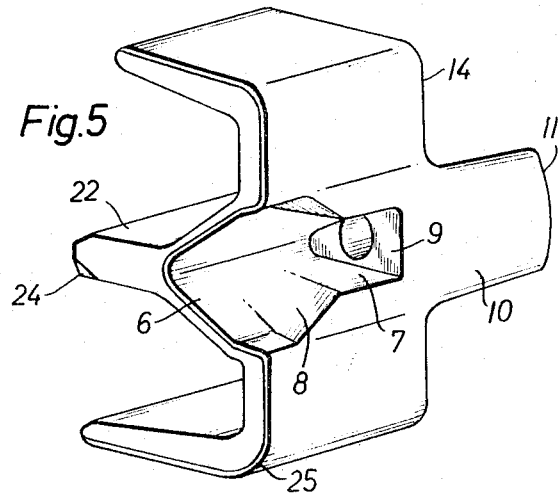
INVENTORS:
GUNTHER DOMMANN
HELMUT TEMME
BY Burgess, Dinklage
& Sprung
ATTORNEYS

United States Patent Office 3,300,031
Patented Jan. 24, 1967

3,300,031
COUPLING DEVICE FOR JOINING MINING
CONVEYOR TROUGH SECTIONS
Günther Dommann, Wethmar, near Lunen, Westphalia,
and Helmut Temme, Lunen, Westphalia, Germany, assignors to Gewerkschaft Eisenhutte Westfalia, Wethmar, near Lunen, Westphalia, Germany, a corporation
of Germany
Filed June 15, 1965, Ser. No. 464,167
Claims priority, application Germany, Nov. 19, 1964,
G 42,054
3 Claims. (Cl. 198—204)

This invention relates in general to improvements in mining conveyors, and more particularly to a coupling device for joining mining conveyor trough sections in end-to-end adjacent relation so as to permit the assembly of a mining conveyor of extended length from a plurality of such similar trough sections.

Mining conveyors, such as the double-chain scraper type, are well known and are being used in ever-increasing numbers in modern long wall mining operations due to their high conveying capacity. The trough sections of these mining conveyors have two oppossed vertical side walls centrally joined by a horizontally extending bottom portion. Each of the side walls may, for example, have a cross-sectional shape substantially approximating a W on its side. The side walls are so positioned that the tops of the W face each other with the bottom portion of the conveyor joined, as for example, by welding to the apex of the central portion of each W cross-section. The individual trough sections are positioned longitudinally one behind the other to form an elongated longitudinally extending trough. Continuous parallel scraper flights with each scraper joined at each end to a continuous but separate chain are drawn by the chains along the top surface of the bottom portion and return below the bottom portion. These flights of scrapers are thus connected to the chains like rungs to a ladder and will cause the conveyance of the material such as coal, which is placed on the top surface of the bottom portion of the conveyor. The side wall portions will retain the material in a transverse direction. The flights of scrapers are driven, for example, by means of a sprocket wheel positioned at the end of the conveyor, over which the chains pass, and which in turn is driven by any suitable drive means.

Individual trough sections of the conveyor are connected to each other so as to allow a limited horizontal and vertical motion therebetween, so that the conveyor as a whole is somewhat flexible and may, for example, assume the contours of the mine floor on which it rests and the mine face along which it extends.

The coupling device of the instant invention accomplishes such connection of successive adjacent trough sections by means of a pair of first coupling members disposed in opposite hand relation to one another, and in corresponding relation to the side walls of a first trough section, and a pair of second coupling members likewise disposed in opposite hand relation to one another and in corresponding relation to the side walls of a second trough section.

Each of the first coupling members is disposed for operative connection, such as by welding, to a common end portion of the first trough section, and each of the second coupling members is similarly disposed for operative connection to a correspondingly opposite, but common end portion of a second trough section which is disposed in endwise adjacent relation to the first trough section.

By constructing the first and second coupling members symmetrical with respect to the plane of the centrally disposed bottom portion of their respective trough sections, both pairs of coupling members can be respectively identical in configuration, since they can be positioned into respective opposite hand relations. Of course, in such case it is assumed that the transverse cross-sections of both trough setions are not only identical, but also correspondingly symmetrical. Otherwise, one coupling member in each first and second pair will be constructed as a right hand coupling member and the other as a left hand coupling member. Regardless of whether the first and second pairs of coupling members are symmetrical, each coupling member in each respective pair performs a substantially identical function in the coupling device according to the invention.

In chain scraper mining conveyors, it is known in the prior art to increase the wear resistance of the individual trough sections by thickening their end portions, or by making such end portions of a more wear-resistant material and fastening them, preferably as interchangeable units, to the middle portions of the trough sections which are of conventional design and construction. It is furthermore known in the prior art, to construct such end pieces in such a manner, preferably by casting, that they do not require any further working or machining, and so that all the shaping that is done in the case of such one-piece trough sections is accomplished in the same casting operation by which their end pieces are made. End pieces of this sort, made of cast manganese steel, hard steel, or other wear resistant material, are of decisive importance for the operation of the conveyor.

In the construction of such trough sections and end pieces thereof, a number of opposing requirements must be met. For example, the end pieces must necessarily be stronger and must have end faces which are broader than those of the trough side walls. In addition, the end pieces must be so constructed as not to interfere with the scraper chain running inside of the trough, nor with the coal planer carried on the outer side of the trough and such end pieces. It must also be possible to couple the conveyor trough sections together in a rapid, secure and absolutely reliable manner. Both the bottom plate end pieces and the side wall, or lateral member end pieces must be capable of being joined to the middle trough section so as to define a substantially flush interior boundary surface. Furthermore, the end pieces are to be joined to the middle trough sections in a manner which provides sufficient strength for transmitting and withstanding all of the normal anticipated load forces that occur during the operation of the conveyor. On the other hand, such end pieces are to be easily replaceable.

It is preferable that the end faces of the abutting end piece coupling members of each pair of trough sections have the greatest possible contact area so as to be capable of absorbing without plastic deformation the relatively high upsetting, or compressive and tensile forces which occur between the trough sections. In the case of conveyor trough sections of the prior art, the dimensional precision necessary for achieving such contact between adjacent trough end pieces is difficult to achieve. This is particularly true when such trough sections are constructed of welded together castings. For this reason, it has been practically impossible in the case of such prior art trough sections to bring the end faces of each to bear fully on one another. As a result, plastic deformation occurred in the area of the coal planar slide in the path of the scraper chain, resulting in premature wear and disturbance in operation.

In the coupling device according to the instant invention, this problem is solved by providing a tenon on each first coupling member and a corresponding mortise in each of the second coupling members. The tenon on the first coupling member is disposed for operative engagement with the mortise in the second coupling member, and fastening means are provided for operatively engaging the first and second coupling members to urge the tenon into a position of operative engagement with the mortise in the second coupling member and thereby join a pair of trough sections together in end-to-end adjacent relation. In accordance with the invention, the tenon has a bearing surface disposed for operative engagement with a correspondingly disposed bearing surface in the mortise, and the tenon has an effective length greater than the effective depth of the mortise by an amount selected in relation to the normal operating compressive stresses transmitted between the bearing surfaces of said tenon and mortise, so as to compensate for the relative plastic deformation therebetween resulting from such stresses.

By this measure, it is brought about that the end bearing surface of the tenon is applied to the bottom bearing surface of the mortise initially, with the end faces of said first and second coupling members being spaced apart by a distance corresponding to the excess of tenon length over mortise depth. During the normal operation of the conveyor, the extremely high compressive forces transmitted between adjacent trough sections causes the bearing surface on the tenon to work into the bearing surface of the mortise so that the two bearing surfaces eventually become shaped into a mating configuration so as to provide a maximum possible bearing surface contact between the tenon and mortise. As the tenon and mortise progressively work into one another, the two end face surfaces of the coupling members approach one another until they also bear fully against one another. When this condition is reached, all of the available bearing surfaces on the coupling members, i.e. both the bearing surfaces between the end faces and the mortise and tenon bearing surfaces, are in operative bearing engagement so as to provide an ample bearing contact surface area for resisting and withstanding the compressive load forces between the conveyor sections.

According to another feature of the invention, the tenon is made with a substantially uniform taper toward its free end which defines its bearing surface, and said bearing surface is shaped so as to be convex and slightly spherical. The mortise is preferably defined by approximately parallel surfaces, so that the tenon can therefore perform angular movements within the mortise, both in the vertical and in the horizontal plane. In addition, the first and second coupling members are fastened together by means of a bolt disposed through a hole extending lengthwise through the tenon and through the bearing surface in the bottom of the mortise, with this bolt hold being considerably greater in diameter than the shank of the bolt, so as to provide sufficient clearance therebetween to accommodate such relative angular movement between the tenon and mortise, and to provide a corresponding angular movement capability between the trough sections joined thereby.

There is an additional requirement that the bolt be capable of insertion from a recess created behind the tenon into a hole provided in said tenon and held therein without rotation relative to said tenon hole. Accordingly, the invention provides profiled surfaces, or other guide means extending from the point where the bolt head contacts the rear end of the tenon which are so shaped in relation to the shape of the bolt head so as to operatively engage same and prevent the bolt from rotating. In general, these profile shapes will differ in accordance with the particular shape of bolt head used. Regardless of the particular shape of such guide profiles, they must have longitudinal bolt head locking surfaces extending for a greater length than the maximum longitudinal bolt play provided. Preferably, these profile surfaces are adapted to grasp the bolt head along at least two of its flat sides, in the manner of a wrench, and are joined by transition surfaces to the contours of a V-shaped recess provided for easy insertion of the bolt, said transition surfaces being so inclined in relation to the bolt that the bolt head will be unable to turn and catch behind the corner edges of the locking profile surfaces, since this would cause a loss of the free longitudinal play of the coupling bolt and eventually cause the head of the bolt to be torn off.

The conventional trough sections for which the coupling device of the invention is designed to join have W-shaped lateral members with tongue members projecting transversely inward and disposed at the apex of the central portion of their respective W-shaped sections for operative connections to a bottom plate member which is laid into a grooved contour provided along the inner edges of these tongue members and welded thereto. These tongue members cooperate with the adjoining portions of the W-shaped lateral members to define a raceway or track for the conveyor drive chain to run in, and for this purpose these tongue members are constructed of somewhat thicker material than the conveyor bottom plate, so as to prevent the chain from running on the weld, resulting in wear and tear on the chain. In the case of prior art conveyor trough sections, having cast attached end pieces, it was practically impossible to prevent the drive chain from having to run around sharp bends, so that the chain, stretched cord-like between two drags, tended to drift more towards the middle of the trough. However, considerable wear occurred precisely at such bend points, because in the case of sharp bends in the vertical plane, the drive chain is forced against the raceways, so as to frequently cause the end portions of the trough bottom plate to become completely worn through.

The invention eliminates this disadvantage by providing tongue-like members on the end coupling pieces which are not only thicker, but also longer than the tongue-like end pieces of the conventional trough section. As a result, the trough bottom end pieces are shorter athwart the coupling members than at the middle section of the trough.

In accordance with the invention, the end coupling members are generally constructed with a thicker material cross-section than provided at corresponding cross-sections of the middle portion of the trough. Accordingly, the tongue members of each of the coupling members are therefore thicker in cross-section than the corresponding portions of the troughs which they joint. Because of the increased thickness of these tongue members, their edges will project outward on both sides of the trough bottom plate, and consequently to prevent excessive wearing or snagging of the chain and/or scrapers at these projecting edges, they are chamfered.

The end coupling members of the coupling device according to the invention are designed for simple replacement upon the trough sections, and accordingly, are preferably fastened by welding thereto, so as to avoid the additional manufacturing expense which would result if such coupling members were fastened to the trough sections by means of bolts or keys. Although generally, welding is not considered as a releasable or replaceable fastening method, welding and cutting equipment is normally available in heavy mining equipment repair shops, and it is often less troublesome to replace parts such as the coupling members of the invention by cutting and welding them than by other methods which are generally associated with releasable fastening.

According to the invention, the exterior boundary edges of the coupling members which are joined to the ends of the trough sections are chamfered so as to permit said coupling members to be fastened to the trough section ends by an externally disposed welding bead applied along such junction edges.

While in certain prior art mining conveyors, tongue members corresponding in profile to the trough section, and extending over the chain movement path from one end piece to engage into a matching recess provided in another end piece were provided for sealing off the gap between the two end pieces of adjoining conveyor sections, such arrangements were generally unsatisfactory because of the sharp edges which normally existed along the mating boundaries of the tongues and recesses. Such sharp edges were ordinarily provided because it was generally believed to be more desirable for sealing purposes to construct the tongues and recesses for the smallest gaps therebetween. It has developed, however, that due to the shifting and pivoting of the trough sections against one another in normal operation, these gap areas are subject to caking, especially when the materials being handled are wet minerals, ores or salts, which restricts the free movement of the troughs in relation to one another and results in the creation of considerable bending stresses on the overlapping tongues. The sharp edges along the tongue and recess joint are attacked by the scrapers and/or chains as well as by any projecting members carried by them which can catch or snag on such edges. It is precisely at these sharp edge areas, therefore, that premature wear-out occurs. The invention solves this wear-out problem by the fact that the transition from the low level of the recess to the higher level of the chain runway surface takes place over slanting or inclined surfaces disposed in such an arrangement that approximately V-shaped gaps result. The material being conveyed can be pushed out of these gaps by its own motion, so that the recesses clean themselves, and it is no longer possible for projecting portions of the scrapers and/or chain to attack the formerly, approximately vertical adjacent tongue and recess edges and wear them down.

For long life and high wear resistance, the conveyor trough sections and end coupling members are preferably made of hard cast steel, but can be made of any other suitable material.

The necessity of dismantling worn parts underground, having them repaired and then reinstalling them results in considerable loss of manhours and conveyor time. With the coupling device constructed according to the invention, there is reasonable assurance that no unforeseen wear will occur, and that the life of such troughs in operation can be reckoned in advance. The overhauling of such a conveyor can then be planned in coordination with all other operational events so as not to suffer interruption of scheduled mining operations by unforseen repair work.

It is therefore, an object of the invention to provide a coupling device for joining mining conveyor trough sections together in end-to-end adjacent relation.

Another object of the invention is to provide a coupling device as aforesaid which permits such conveyor trough sections to be joined securely, but with limited lateral and longitudinal movement play to accommodate corresponding movements of the conveyor.

A further object of the invention is to provide a coupling device as aforesaid having bearing surfaces which become automatically seated for maximum contact surface area by the normal operating load forces which they transmit to one another.

A further object of the invention is to provide a coupling device as aforesaid which when operatively connected to join successive trough sections provides a substantially flush raceway transition surface between adjacent trough sections.

Still another and further object of the invention is to provide a coupling device as aforesaid having a greater load bearing capability than the trough sections which they join.

Other and further objects and advantages of the invention will become apparent from the following detailed description and accompanying drawings in which:

FIG. 3 is a prespective view of a coupling member used in the coupling device of FIGS. 1 and 2, as shown separately therefrom, and in a position corresponding to its installation on the left front end portion of a conveyor trough section extending longitudinally therewith in the lengthwise dimension of perspective.

FIG. 4 is a perspective view of another coupling member used in the coupling device of FIGS. 1 and 2, as shown separately therefrom, and in a position corresponding to its installation on the left rear end portion of another conveyor trough section oriented as in FIG. 3 for mating engagement with the coupling member of FIG. 3 to join such trough sections together.

FIG. 5 is another perspective view of the coupling member of FIG. 4 as shown in a longitudinally reversed position corresponding to its installation upon the right rear end portion of a conveyor trough section.

Referring now to FIGS. 1–5, the adjacent mining conveyor trough sections 1 and 1' are joined together in end-to-end relation by means of two coupling devices A, constructed in accordance with the invention.

Figure 1:
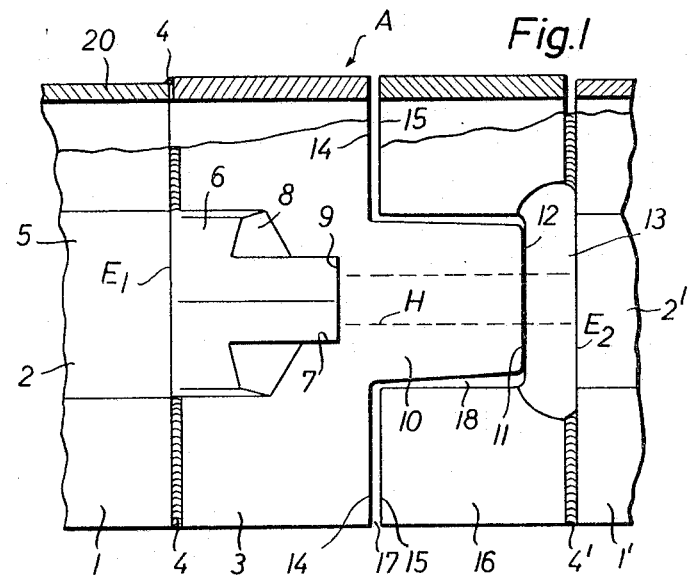
FIG. 1 is a side view, partly in section, of a pair of mining conveyor trough sections joined together by a coupling device according to a preferred embodiment of the invention, shown in a typical initially installed condition.
Figure 2:
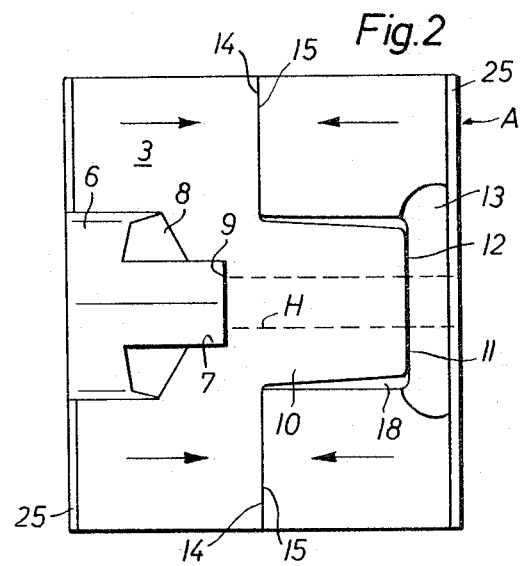
FIG. 2 is a side view of the mining conveyor trough sections and coupling device of FIG. 1, as shown at a time after installation of the coupling device when its load bearing surfaces have become fully seated as a result of the normal operating load forces acting upon said coupling device.

As more clearly shown in FIG. 1, the side wall members 2 and 2' of the trough sections 1 and 1' respectively, are of substantially similar construction as are the trough sections 1 and 1' themselves, and are in substantial longitudinal alignment when joined by coupling members 3 and 16 in each of the two coupling devices A.

The trough sections 1 and 1' are both of conventional construction, each having a pair of oppositely disposed and generally vertical side walls 2 and 2' respectively, which are centrally joined by a horizontally extending bottom plate (not shown). The side walls 2 and 2' can in general have any desired suitable cross-sectional shape, but for purposes of simplifying the description herein, it will be assumed that the side walls 2 and 2' have cross-sectional shapes approximating a W on its side. The side walls 2 and 2' of the trough sections 1 and 1' are so positioned that the outer legs of the W face one another with the bottom plate (not shown) of each trough section 1 and 1' being joined, as for example, by welding to the apex of the central portion of each W cross-section. The upper surface of the bottom plate (not shown) and upper portions of the side walls 2 and 2' define an upper trough portion which is used for conveying materials such as coal and other minerals by means of a continuous double chain scraper (not shown), whereas the lower surface of said bottom plate (not shown) and the lower portions of the side walls 2 and 2' define a lower trough portion which is used as a return raceway for the chain scraper (not shown).

FIG. 1 exemplifies a typical installation of a single coupling device A according to the invention, it being understood for each trough pair connection, two of such coupling devices A are required, such as for example to secure both lateral side walls 2 of the trough section 1 to the two corresponding lateral side walls 2' of the trough section 1', since by reason of FIG. 1 being a side view, only one of the side walls 2 and 2' of each trough 1 and 1' are visible.

The coupling device A shown in FIG. 1 includes a first coupling member 3 disposed for operative connection to an end portion $E_1$ of the trough 1, such as for example, by means of an externally applied weld bead 4, which does not necessarily cover the entire length of the butt joint between said coupling member 3 and trough 1, and a second coupling member 16 disposed for operative connection to a corresponding opposite end portion $E_2$ of the trough section 1', such as by means of a similar weld bead 4'. The coupling member 3 is provided with a tenon 10 disposed for operative engagement with a mortise 18 in the coupling member 16. Fastening means, such as for example, a bolt and nut (not shown) disposed in operative engagement with the coupling members 3 and 16 is provided for urging the tenon 10 of the coupling member 3 into a position of operative engagement with the mortise 18 in the coupling member 16 to effect the joining of the trough sections 1 and 1' together in end-to-end adjacent relation. The coupling member 3 is provided with an end face bearing surface 14 which when the trough sections 1 and 1' are joined together, is normally disposed in opposite relation to a corresponding end face bearing surface 15 of the coupling member 16. The coupling members 3 and 16 are provided with additional bearing surfaces 11 and 12 respectively, said bearing surface 11 being disposed at the free end of the tenon 10 for operative engagement with the correspondingly disposed bearing surface 12 defined by the bottom cheek 13 in the mortise 18 of the coupling member 16.

In accordance with the invention, the tenon 10 is constructed so as to have an effective length which is greater than the effective depth of the mortise 18 by an amount selected in relation to the normal operating compressive stresses transmitted between the bearing surfaces 11 and 12 of the tenon 10 and mortise 18 to accommodate the relative plastic deformation therebetween resulting from such stresses until the end face bearing surfaces 14 and 15 of the coupling members 3 and 16 are positioned in operative engagement with one another.

The V-shaped longitudinal recess 5 defined by the central exterior portion of the W-shaped side wall 2 is effectively continued into the coupling member 3 by the recessed surface 6, which is similarly shaped, and is connected by transition surfaces 8 to a wrench flat-shaped profiling surface 7 which is preferably disposed in axial symmetry with respect to the bolt hole H extending longitudinally through the tenon 10 and bottom cheek 13. The transition surfaces 8 are so inclined in relation to the bolt hole H and profile surfaces 7 that the head of a bolt (not shown) which is inserted through the hole H for effecting the operative connection of the coupling members 3 and 16, is prevented from rotating relative to the coupling members 3 and 16 by the profile surface 7, and is unable to catch anywhere or seat itself anywhere but against the surface 9, even though the profile surface 7 is shaped to provide for a substantial longitudinal bolt play.

The tenon 10 is preferably constructed with a uniform taper towards its free end surface 11 along its three sides and said end bearing surface 11 of the tenon 10 is preferably constructed with a convex shape which is expediently, at least partially spherical.

When the coupling device A is initially installed as exemplified by FIG. 1, a gap 17 exists between the end face surfaces 14 and 15 of the coupling members 3 and 16 by reason of the excess tenon 10 length provided. As a result of the considerable compressive forces acting between the coupling members 3 and 16 in the direction indicated by the arrows in FIG. 2, occurring during normal operation, the mortise 18 and and tenon 10 bearing surfaces 12 and 11 respectively are deformed until, due to the resultant deeper engagement of the tenon 10 into the mortise 18, the end face bearing surfaces 14 and 15 are positioned in full surface contact against one another. When this condition is achieved, further mortise 18 and tenon 10 deformation is terminated since the compressive forces act over a larger total bearing surface area composed of the sum of the bearing surface areas resulting from the contact of the surfaces 14 and 15, and from the contact of the surfaces 11 and 12 whereas formerly in the condition exemplified by FIG. 1, these same compressive forces had to be resisted by the effective contact area between the surfaces 11 and 12 alone.

The broken-away sections illustrated in FIG. 1 indicate that the material thicknesses of the coupling members 3 and 16 are somewhat greater than those at corresponding portions of the trough sections 1 and 1'. Although the wall thicknesses of the various portions of the coupling members 3 and 16 can be tapered with increasing thickness towards their end face extremities 14 and 15, the coupling members 3 and 16 are preferably constructed at all sections thereof with greater thickness than the corresponding wall thickness 20 of the trough sections 1 and 1'.

In the perspective views of FIGS. 3 and 4, the coupling members 3 and 16, which face one another, are shown from the inside. The broken lines drawn into the end face 30 indicate the contact area of the corresponding end face of the trough section (not shown), as well as the contact area of the bottom plate (not shown). As can be clearly seen from the aforesaid broken outline, the tongue-like strip 21 of the trough section is shorter than the corresponding tongue-like strip 22 of the coupling members 3 and 16. Accordingly, although not specifically shown, this results in that the bottom plate end piece (not shown), which is welded in between the tongues 22 is shorter athwart the direction of longitudinal conveyance than the midsection portions of the bottom plate (not shown). The result is a surface 23 extending freely into the upper passage and lower passage, which is protected by a corresponding chamfer 24 against the impact of the scrapers and/or chains (not shown). The chamfers 25 facilitate clean welding from the outside.

The conically tapered tenon 10 of the coupling member 3 of FIG. 4 is disposed for operative engagement into the mortise 18 of the coupling member 3 of FIG. 3, so that the bearing surface 11 of the tenon 10 lies against the inside surface 12 of the bottom cheek 13. Since FIG. 3 is an inside perspective view, the mortise 18 and bearing surface 12 are not visible therein.

The coupling member 3 of FIG. 4 is provided with an additional tongue member 26 which extends longtiudinally from the centrally disposed tongue 22 thereof. This second tongue 26 functions as a sealing lap, and is disposed for operative engagement with a corresponding longitudinal recess 27 provided in the other coupling member 16, as indicated by FIG. 3, with said tongue 26 and longitudinal recess 27 being preferably disposed in relation to each other so as to define an approximately flush longitudinal raceway surface 29 at their respective boundaries. To provide a tongue 26 and recess 27 longitudinal boundary joint which is self-cleaning, the recess 27 is provided with a chamfered surface 28 which defines a smooth transition between the bottom surface of the recess 27 and the raceway surface 29.

As can be appreciated by the artisan, the coupling device A according to a preferred embodiment of the invention, as exemplified by FIGS. 1–5, is susceptible of many potential variations in its detail features, such as may be suggested from the foregoing description. For example, the tongue 26 can be provided on the coupling member 16 with the recess 27 being correspondingly provided on the coupling member 3. Furthermore, the side walls 2 and 2' on commonly disposed sides of the trough sections 1 and 1' can be joined by means of a coupling device A having the coupling member 3 connected to the side wall 2 and the coupling member 16 connected to the side wall 2', with the side walls 2 and 2' on the opposite sides of the trough sections 1 and 1' being joined by a coupling device A wherein the coupling member 16 is connected to the side wall 2 and the coupling member 3 is connected to the side wall 2'.

What is claimed is:

1. A coupling device for joining mining conveyor trough sections in end-to-end adjacent relation, which comprises a first coupling member disposed for connection to an end portion of a first conveyor trough section, a second coupling member disposed for connection to an opposite end portion of a second conveyor trough section disposed in endwise adjacent relation to said first conveyor section, said first coupling member having a tenon disposed for operative engagement with a mortise in said second coupling member, and a fastening member extending through said mortise and tenon to urge same together into mutual engagement to join said first and second conveyor trough sections together in end-to-end adjacent relation, said first and second coupling members each having a first bearing surface and a second bearing surface, said first bearing surfaces being disposed in opposite relation to each other and said second bearing surfaces being also disposed in opposite relation to each other, the second bearing surface of said first coupling member being located on the free end of the tenon thereof, and the second bearing surface of said second coupling member being located at the bottom of the mortise thereof, said tenon having an effective length greater than the effective depth of said mortise by an amount selected in relation to the normal operating compressive stresses transmitted between said second bearing surfaces on the tenon and mortise to accommodate the relative plastic deformation therebetween resulting from such stresses until the first bearing surfaces of said coupling members are positioned in bearing engagement with each other.

2. The coupling device according to claim 1 wherein the tenon of the first coupling member is tapered uniformly toward its free end, and said second bearing surface at the free end of the tenon is at least partially spherical.

3. The coupling device according to claim 1 wherein said fastening member is a bolt having a non-circular head, and including means defining a surface in one of said coupling members disposed for normal engagement with said bolt head to prevent the rotation of the bolt relative to said coupling members and to permit limited longitudinal displacement of said bolt relative to said coupling members.

References Cited by the Examiner

German printed application, 1,128,806, April 1962.

SAMUEL F. COLEMAN, *Primary Examiner.*

RICHARD E. AEGERTER, *Examiner.*